(12) United States Patent
Wiskott et al.

(10) Patent No.: US 6,563,950 B1
(45) Date of Patent: May 13, 2003

(54) LABELED BUNCH GRAPHS FOR IMAGE ANALYSIS

(75) Inventors: Laurenz Wiskott, San Diego, CA (US); Christoph von der Malsburg, Santa Monica, CA (US)

(73) Assignee: Eyematic Interfaces, Inc., Santa Monica, CA (US)

( * ) Notice: Subject to any disclaimer, the term of this patent is extended or adjusted under 35 U.S.C. 154(b) by 0 days.

(21) Appl. No.: 10/029,691

(22) Filed: Dec. 21, 2001

Related U.S. Application Data

(63) Continuation of application No. 09/760,685, filed on Jan. 16, 2001, now Pat. No. 6,356,659, which is a continuation of application No. 08/882,223, filed on Jun. 25, 1997, now Pat. No. 6,222,939.
(60) Provisional application No. 60/020,810, filed on Jun. 25, 1996.

(51) Int. Cl.[7] .............................. G06K 9/00; G06K 9/34; G06K 9/46; G06K 9/68
(52) U.S. Cl. ...................... 382/209; 382/118; 382/180; 382/181; 382/190; 382/218
(58) Field of Search ................................. 382/103, 118, 382/151, 159, 181, 190, 201, 209, 218, 226, 240, 276, 278, 282, 291, 308, 180; 345/419, 473, 619, 646; 348/77, 169

(56) References Cited

U.S. PATENT DOCUMENTS

| | | |
|---|---|---|
| 4,725,824 A | 2/1988 | Yoshioka |
| 4,805,224 A | 2/1989 | Koezuka et al. |
| 4,827,413 A | 5/1989 | Baldwin et al. |
| 5,168,529 A | 12/1992 | Peregrim et al. |
| 5,187,574 A | 2/1993 | Kosemura et al. |
| 5,220,441 A | 6/1993 | Gerstenberger |
| 5,333,165 A | 7/1994 | Sun |
| 5,383,013 A | 1/1995 | Cox |
| 5,430,809 A | 7/1995 | Tomitaka |
| 5,432,712 A | 7/1995 | Chan |
| 5,511,153 A | 4/1996 | Azarbayejani et al. |
| 5,533,177 A | 7/1996 | Wirtz et al. |
| 5,588,033 A | 12/1996 | Yeung |
| 5,625,717 A | 4/1997 | Hashimoto et al. |

(List continued on next page.)

FOREIGN PATENT DOCUMENTS

DE 4406020 C1 6/1995

OTHER PUBLICATIONS

Akimoto, T., et al., "Automatic Creation of Facial 3D Models", IEEE Computer Graphics & Apps., pp. 16–22, Sep. 1993.

(List continued on next page.)

Primary Examiner—Andrew W. Johns
Assistant Examiner—Daniel G. Mariam
(74) Attorney, Agent, or Firm—Gray Cary Ware & Freidenrich; Terrance A. Meador

(57) ABSTRACT

A process for image analysis which includes selecting a number M of images, forming a model graph from each of the number of images, such that each model has a number N of nodes, assembling the model graphs into a gallery, and mapping the gallery of model graphs into an associated bunch graph by using average distance vectors $\Delta_{ij}$ for the model graphs as edge vectors in the associated bunch graph. A number M of jets is associated with each node of the associated bunch graph, and at least one jet is labeled with an attribute characteristic of one of the number of images. An elastic graph matching procedure is performed wherein the graph similarity function is replaced by a bunch-similarity function.

13 Claims, 3 Drawing Sheets

U.S. PATENT DOCUMENTS

| | | |
|---|---|---|
| 5,680,487 A | 10/1997 | Markandey |
| 5,699,449 A | 12/1997 | Javidi |
| 5,714,997 A | 2/1998 | Anderson |
| 5,715,325 A | 2/1998 | Band et al. |
| 5,719,954 A | 2/1998 | Onda |
| 5,736,982 A | 4/1998 | Suzuki et al. |
| 5,764,803 A | 6/1998 | Jacquin et al. |
| 5,774,591 A | 6/1998 | Black et al. |
| 5,809,171 A | 9/1998 | Neff et al. |
| 5,828,769 A | 10/1998 | Burns |

OTHER PUBLICATIONS

Ayache, N. et al., "Rectification of Images of Binocular and Trinocular Stereovision", Proc. Of 9th Int'l., Conference on Pattern Recognition, 1, pp. 11–16, Italy, 1988.

Belhumeur, P., "A Bayesian Approach to Binocular Stereopsis", *Int'l. J. Of Computer Vision*, 19(3), pp. 237–260, 1996.

Beymer, D. J., "Face Recognition Under Varying Pose", MIT A.I. Lab, Memo No. 1461, pp. 1–13, 12/93.

Beymer, D.J., "Face Recognition Under Varying Pose", MIT A.I. Lab. Research Report, 1994, pp. 756–761.

Buhmann, J. et al., "Distortion Invariant Object Recognition By Matching Hierarchically Labeled Graphs", In Proceedings IJCNN Int'l Conf. Of Neural Networks, Washington, D.C. Jun. 1989, pp. 155–159.

DeCarlo, D., et al., "The integration of Optical Flow and Deformable Models with Applications to Human Face Shape and Motion Estimation", pp. 1–15, In Proc. CVPR '96, pp. 231–238 (published)[TM Sep. 18, 1996].

Devernay, F. et al., "Computing Differential Properties of 3–D Shapes from Steroscopic Images without {3–D} Models", INRIA, RR–2304, pp. 1–28, Sophia, Antipolis, 1994.

Dhond, U., "Structure from Stereo: a Review", IEEE Transactions on Systems, Man, and Cybernetics, 19(6), pp. 1489–1510, 1989.

Fleet, D.J., et al., "Computation of Component Image Velocity from Local Phase Information", *Int., J. Of Computer Vision*, 5:1, pp. 77–104 (1990).

Fleet, D.J., et al. *Measurement of Image Velocity*, Kluwer Academic Press, Boston, pp. I–203, 1992.

Hall, E.L., "Computer Image Processing And Recognition", Academic Press 1979, 99. 468–484.

Hong, H., et al., "Online Facial Recognition based on Personalized Gallery", Proceedings of Int'l Conference On Automatic Face And Gesture Recognition, pp. 1–6, Japan Apr. 1997.

Kolocsai, P., et al, Statistical Analysis of Gabor–Filter Representation, *Proceedings of International Conference on Automatic Face and Gesture Recognition*, 1997, 4 pp.

Kruger, N., "Visual Learning with a priori Constraints", *Shaker Verlag*, Aachen, Germany, 1998, pp. 1–131.

Kruger, N., et al, "Principles of Cortical Processing Applied to and Motivated by Artificial Object Recognition", Institut fur Neuroinfomatik, *Internal Report 97–17*, Oct. 1997, pp. 1–12.

Kruger, N., et al, "Autonomous Learning of Object Representations Utilizing Self–Controlled Movements", 1998, *Proceedings of NN98*, 5 pp.

Kruger, N., et al, "Object Recognition with a Sparse and Autonomously Learned Representation Based on Banana Wavelets", *Internal Report 96–11*, Institut fur Neuroinfomatik, Dec. 96, pp. 1–24.

Kruger, N., et al, "Object Recognition with Banana Wavelets", *European Symposium on Artificial Neural Networks* (ESANN97), 1997, 6 pp.

Kruger, N., "An Algorithm for the Learning of Weights in Discrimination Functions Using a priori Constraints", *IEEE Transactions on Pattern Analysis and Machine Intelligence*, vol. 19, No. 7, Jul. 1997, pp. 764–768.

Lades, M., et al, "Distortion Invarient Object Recognition in the Dynamic Link Architecture", *IEEE Transactions on Computers*, vol. 42, No. 3, 1993, 11 pp.

Luong, Q. T., et al, "The Fundamental Matrix, Theory, Algorithm, and Stability Analysis", *INRIA*, 1993, pp. 1–46.

Manjunath, B. S., et al, "A Feature Based Approach to Face Recognition", *In Proceedings IEEE Conference on Computer Vision and Pattern Recognition*, pp. 373–378, Mar. 1992.

Mauer, T., et al, "Single–View Based Recognition of Faces Rotated in Depth", *In Proceedings of the International Workshop on Automatic Face and Gesture Recognition*, pp. 248–253, Zurich, CH, Jun. 26, 1995.

Mauer, T., et al, "Learning Feature Transformations to Recognize Faces Rotated in Depth", *In Proceedings of the International Conference on Artificial Neural Networks*, vol. 1, pp. 353–358, Paris, France, Oct. 9–13, 1995.

Mauer, T., et al, "Tracking and Learning Graphs and Pose on Image Sequences of Faces", *Proceedings of 2nd International Conference on Automatic Face and Gesture Recognition*, Oct. 14–16, 1996, pp. 176–181.

Maybank, S. J. et al, "A Theory of Self–Calibration of a Moving Camera", *International Journal of Computer Vision*, 8(2), pp. 123–151, 1992.

McKenna, S.J., et al, Tracking Facial Feature Points With Gabor Wavelets and Shape Models, (publication & date unknown), 6 pp.

Okada, K., et al, "The Bochum/USC Face Recognition System", 19 pp. (publication & date unknown).

Okutomi, M., et al, "A Multiple–Baseline Stereo", *IEEE Trans. on Pattern Analysis and Machine Intelligence*, vol. 15, No. 4, pp. 353–363, Apr. 1993.

Peters, G., et al, "Learning Object Representations by Clustering Banana Wavelet Responses", *Tech. Report IR–INI 96–09*, Institut fur Neuroinformatik, Ruhr Universitat, Bochum, 1996, 6 pp.

Phillips, P. J., et al, "The Face Recognition Technology (FERET) Program", *Proceedings of Office of National Drug Control Policy*, CTAC International Technology Symposium, Aug. 18–22, 1997, 10 pages.

Pighin, F, et al, "Synthesizing Realistic Facial Expressions from Photographs", *In SIGGRAPH 98 Conference Proceedings*, pp. 75–84, Jul. 1998.

Roy, S., et al, "A Maximum Flow Formulation of the N–Camera Stereo Correspondence Problem", *IEEE, Proceedings of International Conference on Computer Vision*, Bombay, India, Jan. 1998, pp. 1–6.

Sara, R. et al "3–D Data Acquision and Interpretation for Virtual Reality and Telepresence", *Proceedings IEEE Workshop Computer Vision for Virtual Reality Based Human Communication*, Bombay, Jan. 1998, 7 pp.

Sara, R. et al "Fish–Scales: Representing Fuzzy Manifolds", *Proceedings International Conference Computer Vision*, ICCV '98, pp. 811–817, Bombay, Jan. 1998.

Sara, R., et al, "On Occluding Contour Artifacts in Stereo Vision", *IEEE, Proceedings of International Conference Computer Vision and Pattern Recognition*, Puerto Rico, 1997, 6 pp.

Steffens, J., et al, "PersonSpotter—Fast and Robust System for Human Detection, Tracking, and Recognition", *Proceedings of International Conference on Automatic Face and Gesture Recognition*, 6 pp., Japan–Apr. 1998.

Theimer, W. M., et al, "Phase–Based Binocular Vergence Control and Depth Reconstruction using Active Vision", *CVGIP: Image Understanding*, vol. 60, No. 3, Nov. 1994, pp. 343–358.

Tomasi, C., et al., "Stereo Without Search", *Proceedings of European Conference on Computer Vision*, Cambridge, UK, 1996, 14 pp. (7 sheets).

Triesch, J., et al, "Robust Classification of Hand Postures Against Complex Backgrounds", *Proceedings of the Second International Conference on Automatic Face and Gesture Recognition*, Killington, VT, Oct. 1996, 6 pp.

Turk, M., et al, "Eigenfaces for Recognition", *Journal of Cognitive Neuroscience*, vol. 3, No. 1, pp. 71–86, 1991.

Wiskott, L., et al, "Face Recognition and Gender Determination", *Proceedings of International Workshop on Automatic Face and Gesture Recognition*, pp. 92–97, Zurich CH, Jun. 26, 1995.

Wiskott, L., et al, "Face Recognition by Elastic Bunch Graph Matching", *Internal Report, IR–INI 96–08*, Institut fur Neuroinfomatik, Ruhr–Universitat, Bochum, pp. 1–21, Apr. 1996.

Wiskott, L., "Labeled Graphs and Dynamic Link Matching for Face Recognition and Scene Analysis", *Verlag Harr Deutsch*, Thun–Frankfurt am Main. Reihe Physik, Dec. 1995, pp. 1–109.

Wiskott, L., "Phanton Faces for Face Analysis". *Proceedings of 3rd Joint Symposium on Neural Computation*, Pasadena, CA, vol. 6, pp. 46–52, Jun. 1996.

Wiskott, L., "Phanton Faces for Face Anaylsis". *Internal Report, IR–INI 96–06*, Institut fur Neoroinfomatik, Ruhr–Universitat, Bochum, Germany, Apr. 1996, 12 pp.

Wiskott, L. "Phantom Faces for Face Analysis", *Pattern Recognition*, vol. 30, No. 6, pp. 837–846, 1997.

Wiskott, L., et al, "Face Recognition by Elastic Bunch Graph Matching", *IEEE Transactions on Pattern Analysis and Machine Intelligence*, 19(7), pp. 775–779, 1997.

Wong, R., et al, "PC–Based Human Face Recognition System", *IEEE*, pp. 641–644, 1992.

Wurtz, R., "Object Recognition Robust Under Translations, Deformations, and Changes in Background", *IEEE Transactions on Patern Analysis and Machine Intelligence*, vol. 19, No. 7, Jul. 1997, pp. 769–775.

Wurtz, R., et al, "Corner Detection in Color Images by Multiscale Combination of End–stopped Cortical Cells", *Artificial Neural Networks—ICANN '97*, Lecture Notes in Computer Science, vol. 1327, pp. 901–906, Springer–Verlag, 1997.

Yao, Y., et al, "Tracking a Dynamic Set of Feature Points", *IEEE Transactions on Image Processing*, vol. 4, No. 10, Oct., 1995, pp. 1382–1394.

LABELED BUNCH GRAPHS FOR IMAGE ANALYSIS

This application is a continuation of U.S. application Ser. No. 09/760,685, filed Jan. 16, 2001 (U.S. Pat. No. 6,356,659) which is a continuation of U.S. application Ser. No. 08/882,223, filed Jun. 25, 1997, now U.S. Pat. No. 6,222,939 which claims the benefit from U.S. Provisional Application No. 60/020,810, filed Jun. 25, 1996.

FIELD OF THE INVENTION

The present invention relates to technology for recognizing and analyzing objects that are shown in camera or video images. In particular, the present invention relates to technology which compensates for variability of images for different objects of the same type, or for images of the same object (due to differences in position, scale, orientation, pose, illumination, deformation, noise etc.).

BACKGROUND OF THE INVENTION

Techniques exist for analyzing captured images in order to perform image matching or other functions, such as the extraction of a fixed, sparse image representation from each image in an image gallery and for each new image to be recognized. Conventional techniques, however, require a great deal of computational power and time. When comparing a new image with all images stored in a gallery of thousands of images, each comparison requires a new, computationally-expensive matching process. There is a need for an image analysis technique that is more easily implemented.

SUMMARY OF THE INVENTION

It is therefore an objective of the present invention to provide a technique for image analysis that is more easily implemented than are conventional techniques, and which requires less computational power and time.

The present invention provides a process for image analysis. The process includes selecting a number M of images, forming a model graph from each of the number of images, such that each model has a number N of nodes, assembling the model graphs into a gallery, and mapping the gallery of model graphs into an associated bunch graph by using average distance vectors $\Delta_{ij}$ for the model graphs as edge vectors in the associated bunch graph, such that $$\Delta_{i,j} = \frac{1}{M} \sum_m \Delta_{ij}^m.$$

where $\Delta_{ij}$ is a distance vector between nodes i and j in model graph m. A number M of jets is associated with each node of the associated bunch graph, and at least one jet is labeled with an attribute characteristic of one of the number of images. An elastic graph matching procedure is performed, wherein the graph similarity function is replaced by a bunch-similarity function $S(G, G^I)$ such that $$S(G, G^I) = \frac{1}{N} \sum_n \max_m S(J_n^m, J_n^I).$$

The model bunch graph may be manually prepared by associating a standard grid of points over an image, correcting node positions to fall over designated sites characteristic of the image, and extracting jets at the nodes. Object recognition may be performed by selecting a target image, extracting an image graph from the target image, comparing the target image graph to the gallery of model graphs to obtain a graph similarity $S(G^M, G^I)$ such that $$S(G^M, G^I) = \frac{1}{N} \sum_n S(J_n^M, J_n^I) - \frac{\lambda}{E} \sum_e (\Delta \bar{x}_e^M - \Delta \bar{x}_e^I)^2; \text{ and}$$

identifying a model graph having a greatest graph similarity with the image graph.

DETAILED DESCRIPTION OF THE INVENTION

Figure 1:
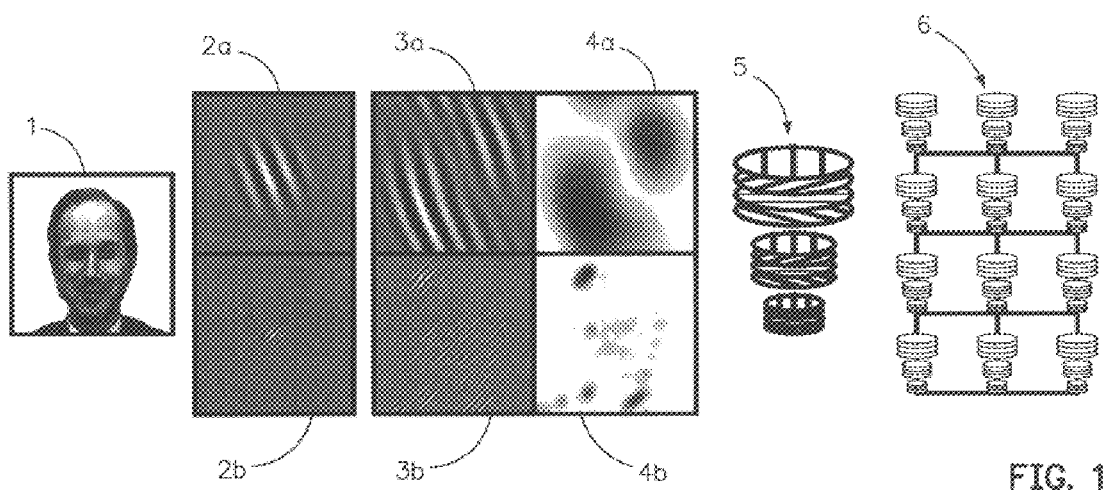
FIG. 1 shows a data format for image representation.

The process of the invention is based on a technique of representing images by wavelets and of comparing different images by elastic graph matching. An application of the present invention is the extraction of a fixed, sparse image representation (called "image graph") from each image in the gallery and of each new image to be recognized. An image graph sparsely summarizes an image in terms of those data that are important for recognition or analysis. Comparison of two image graphs is computationally very cheap, and recognition from large galleries thus becomes feasible. The extraction of the relevant data (that is, of the image graph) from an image is achieved with reference to a small collection (the "bunch graph") of sample images in which the relevant data have been identified manually. The different sample images in the bunch graph are selected to cover a large range of variants of the type of objects to be recognized or analyzed. During the matching, of the bunch graph to an image, data taken from different sample images are combined. The bunch graph thus covers a virtually Infinite range of variants.

Jets and Jet Comparison

Graphs G with an underlying two-dimensional topography are used. Each node denotes a jet $J_n$ and each edge denotes a distance vector $\Delta x_e$. In the simplest case the graph has the form of a rectangular grid with constant vertical and constant horizontal spacing between nodes.

The jets are based on a wavelet transform, which is defined as a convolution with a family of complex Gabor kernels $$\psi_j(\bar{x}) = \frac{k_j^2}{\sigma^2} \exp\left(-\frac{k_j^2 x^2}{2\sigma^2}\right) \left[\exp(i\bar{k}_j \cdot \bar{x}) - \exp\left(-\frac{\sigma^2}{2}\right)\right], \quad (1)$$

providing at each location x (that is, pixel row and column) the coefficients $$J_j(\bar{x}) = \sum_{\bar{x}'} I(\bar{x}') \psi_j(\bar{x} - \bar{x}') \quad (2)$$

given the image gray level distribution I(x). In the sum, x' runs over all pixels within the area where $\psi(x-x')$ is substantially different from zero.

The kernel $\psi(x-x')$ has the shape of a plane wave (controlled by a wave vector $k_j$) which is restricted by a Gaussian envelope function of width σ/k with σ=2π. In addition, the kernels are corrected for their DC value, i.e., the sum $\Sigma_x \psi_j(x)$ vanishes. All kernels are similar in the sense that they can be generated from one kernel simply by dilation and rotation. The array of k-values is used such that $$\vec{k}_j = \begin{pmatrix} k_v \cos\phi_\mu \\ k_v \sin\phi_\mu \end{pmatrix}, k_v = 2 - \frac{v+2}{2}\pi, \phi_v = \mu\frac{\pi}{8}. \quad (3)$$

with kernel size index $v \in \{0, \ldots, 4\}$, and orientation index $\mu \in \{0, \ldots, 7\}$, for simplicity labeled with one index $j=\mu+8v$.

The full wavelet transform provides 40 complex coefficients at each pixel (5 frequencies and 8 orientations). This array of coefficients at one pixel will be referred to as the jet J(x), see FIG. 1. In the system of the present invention, jets play the role of local feature vectors. Images are compared in terms of jets (and not in terms of pixel values), as described below.

The complex jet coefficients $J_j$ can be written as $J_j(x)=a_j(x)\exp(i\#_j(x))$ with a smoothly changing magnitude $a_j(x)$, and a phase $i\#_j(x)$ spatially varying with the characteristic spatial frequency of the respective Gabor kernel. The two jets J and J' can be compared in terms of a "magnitude only" similarity function $$S_a(J, J') = \frac{\sum_j a_j a'_j}{\sqrt{\sum_j a_j^2 \sum_j a'^2_j}}. \quad (4)$$

This similarity function $S_a$ has the advantage of varying smoothly with shifts of the image. However, the present invention also makes use of a "phase sensitive" similarity function $S_\phi$:

$$S_\phi(J, J') = \frac{\sum_j a_j a'_j \cos(\phi_j - \phi'_j - \vec{d}\cdot\vec{k}_j)}{\sqrt{\sum_j a_j^2 \sum_j a'^2_j}}. \quad (5)$$

Here, the $k_j$ are the wave vectors of the Gabor kernels, as above, and d is an estimated displacement vector which compensates for the rapid phase shifts. d is determined by maximizing $S_\phi$ in its Taylor expansion within a small square centered on d=0. The term d·$k_j$ with the estimated displacement vector d compensates for rapid phase shifts due to small variation in the positions x or x' of the two jets being compared.

Model Graphs

In order to store a part of an image that contains an object (like the face in the original image 1 in FIG. 1), a set "grid" of pixel positions ("nodes", see 23 in FIG. 2) is selected in the image. The grid can be exactly rectangular (as in 21a, FIG. 2) or can be deformed (as in 21b, FIG. 2) or of a different arrangement, such as in FIG. 3. Nodes can be selected by hand, or they can be selected by the automatic procedure described below. Pairs of neighboring nodes can be connected by "edges," see FIGS. 2 or 3. For each node, after it is positioned within the image, the jet computed at that pixel location is recorded. In addition, for each edge, a distance vector is recorded (the distance vector is a pair of pixel distances in the x and y directions). This data structure (jets and distance vectors) is called an "image graph". It can be incorporated in a "model domain", by storing it in an appropriate file. In this case, the graph is called a "model graph". Herein, two types of model domains will be described, called "gallery" and "bunch graph", as described below.

Elastic Graph Matching

Elastic Graph Matching is the process by which a stored model graph $G^M$ is matched to a new image. Let the model graph have N nodes, labeled with jets $J_n$, and E edges, labeled with distance vectors $\Delta x_e$. In the matching process, an image graph $G^I$ is selected from the new image. This image graph has the same structure as $G^M$ (same number of nodes, same pairs of nodes connected by edges). During the matching process, node points are selected in the image, jets are extracted from the image, distance vectors are computed, and the resulting structure, a "tentative image graph", is compared to the model graph $G^M$. This comparison results in a "graph similarity"

$$S(G^M, G^I) = \frac{1}{N}\sum_n S(J_n^M, J_n^I) - \frac{\lambda}{E}\sum_e (\Delta \vec{x}_e^M - \Delta \vec{x}_e^I)^2. \quad (6)$$

The first term on the right-hand-side is called the "node similarity" and is computed as the average similarity between jets at corresponding nodes, computed with either the magnitude similarity $S=S_a$, equation 4, or the phase similarity $S=S_\phi$, equation 5. The second term on the right-hand-side is the "edge similarity," computed as the average squared difference between pairs of corresponding edges. (The second term is also called the "distortion term"). The system parameter λ controls the relative importance of node similarity and edge similarity.

In the matching process, the graph similarity (6) between the image graph and the model graph is optimized by varying the node positions of the tentative image graph appropriately, with the jet for each node being determined anew after the position of the node is varied. After each modification, the new graph similarity is computed. If it is higher, the new tentative image graph is selected; if it is lower, the old tentative image graph is retained.

A simple procedure for optimizing the tentative image graph is as follows.

Global move (coarse): The first tentative image graph is formed as an exact replica of the relative node positions of the model graph, placed in the middle of the image. Then, the position of the tentative image graph is modified (without distortion) in random steps of plus or minus 5 pixels in x or y direction, until a (local) optimum is reached, using the magnitude similarity, equation 4.

Global move (fine): the procedure is repeated, with a step size of one pixel instead of 5, again using the magnitude similarity, equation 4.

Local move (magnitude); Randomly chosen nodes are shifted in random steps of plus or minus one pixel in the x or y direction, again using the magnitude similarity, equation 4. The procedure is repeated until N visits to nodes have not led to an improvement of the graph similarity.

Local move (phase): Randomly chosen nodes are visited and displacements d are chosen (up to a maximum of 1 pixel distance) to optimize the phase similarity, equation 5. Each node is visited just once.

Figure 2:
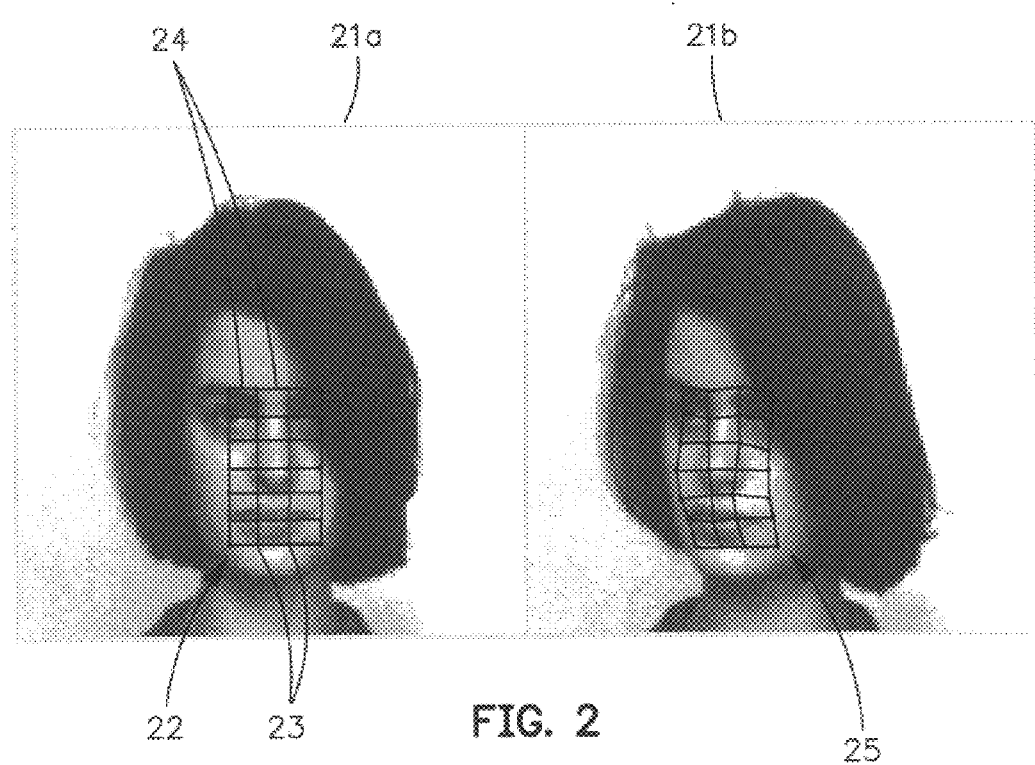
FIG. 2 shows graphs as placed over objects.
Figure 3:
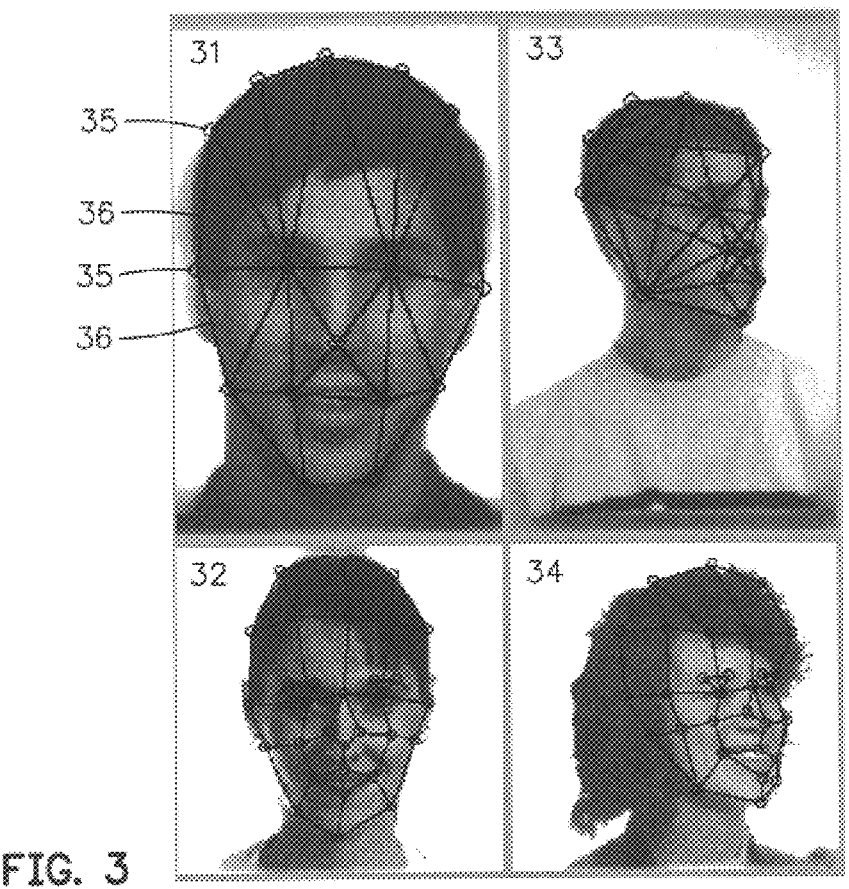
FIG. 3 shows graphs as placed over objects, emphasizing an irregular, object-type adapted graph structure.

The optimal graph resulting at the end of this elastic matching procedure is called the "image graph." For an example see 21b in FIG. 2 or 31–34 in FIG. 3.

Although the optimization procedure just described is the preferred one, many variations are possible: using phase similarity early on; using only low-frequency components of the jets early in the procedure; varying the parameter λ with time; deforming the grid several nodes at a time; rotating the grid (with or without adjustment of the jet components for rotation); scaling the grid (with or without adjustment of the jet components for scale); and disregarding certain nodes at certain stages of the process or on the basis of their node similarity.

Bunch Graphs and Labeled Bunch Graphs

From a number M of images of different objects of a given class (and/or different images of the same object), M model graphs are assembled into a gallery. These M model graphs are all of the same qualitative structure, that is, they have the same number N of nodes (which are numbered 1 to N), and each pair of nodes (identified by a pair of numbers) is either connected in all of the M model graphs or not connected in all model graphs. The model graphs in the gallery differ in the jets that are affixed to the nodes and in the distance vectors affixed to the edges. One may imagine the model graphs as stacked up on each other, see FIG. 4, with nodes bearing the same number aligned with each other.

This gallery of model graphs is then mapped into a different graph structure, called a "bunch graph", constructed in the following way. Let the distance vector between nodes i and j in model graph m be designated as $\Delta_{ij}^m$. Then the average $\Delta_{ij}$ of that distance vector over all model graphs is computed, $$\Delta_{ij} = \frac{1}{M} \sum_m \Delta_{ij}^m. \tag{7}$$

These average distance vectors are then used as the edge vectors in the new graph structure called the associated bunch graph. The associated bunch graph has N nodes, but differs from the image graphs and model graphs in that there are now M jets for each node of the bunch graph. Each jet in the bunch graph is designated by the number of the model graph in the associated gallery which contains that specific jet.

Each jet of this collection of models in the associated gallery and thus each corresponding jet in the bunch graph may be labeled with one or several attributes characterizing the object that is represented by the model. For example, if the models represent human faces, an attribute could be the gender of the person, or the presence or absence of attributes like eyeglasses or beard or a particular type of hair style.

The collection of jets of this kind plus the attribute labels attached to each jet, plus the average edge vectors, may be called a "model stack" or "generalized object knowledge" or "labeled bunch graph," which latter term is the name adopted herein. The name derives from the view that the labeled bunch graph consists of a single graph with N nodes, each of which has M different jets, which are labeled by attributes in addition to being designated by a sequence number.

The bunch graph idea was developed for applications involving objects which are qualitatively of the same structure. Examplary object types are different individuals of a given animal species (man, dog, horse, . . . ), or different types of the same kind of technical implement (automobiles, motorcycles, airplanes, computer terminals . . . ), or corresponding parts of a kind of animal or implement (human face, human hand, front of automobile, tail of airplane . . . ). The general structure of the model grid (for instance, the aspect ratio length/width of the graphs, or the local density of nodes) is adapted to the general type of object or part to be handled, see FIG. 3 for examples. Further, the idea is that jets attached to the same node of the bunch graph encode the same qualitative region of the object (for instance, the left eye of all stored faces, if the application is concerned with faces).

Labeled Bunch Graph Matching

When comparing an image to the bunch graph G instead of to a single model graph $G^M$, the elastic graph matching procedure previously described is to be modified simply by replacing the graph-similarity function $S(G^M, G^I)$, equation 6, by a "bunch-similarity function"

$$S(G, G^I) = \frac{1}{N} \sum_n \max_m S(J_n^m, J_n^I). \tag{8}$$

In this, each node n of the tentative image graph $G^I$, when compared to node n of the bunch graph, selects the jet with maximal similarity. The bunch-similarity function contains no term sensitive to deformations.

As when matching a single model graph to an image, the tentative image graph is modified to optimize its similarity to the bunch graph, this time using the similarity of equation 8, however. Optimization is done according to the same schedule as the elastic graph matching procedure described previously. After each move of a node of the tentative image graph, the node is free to pick the best-matching jet attached to the corresponding node of the bunch graph, see FIG. 4. Again, variation in size and orientation of the object in the image can be accommodated by allowing for changes, in size and orientation of the tentative image graph (especially in the early global move stage of the match), along with proper transformation of the jet components.

Practical Operations with the Labeled Bunch Graph

1. Manual Preparation of Bunch Graph. To deal with images of a specified type of object from a uniform viewpoint (for instance, frontal images of human faces), a bunch graph can be prepared by a "manual" method. A collection of representative images of that class of objects is acquired (typically of the order of 50 to 100). A suitable graph structure (that is, an arrangement of node points plus a set of edges connecting them) is selected. For examples see FIGS. 2 and 3. The graph structure can be regular, as in FIG. 2, or it can be adapted to the object type, see FIG. 3.

The qualitative graph is then placed on individual images, such that node points occupy appropriately fixed positions. This is done by first placing a standard grid of points (depending on the object) over the object In the image, and by then correcting individual node positions such that they fall over appropriately designated sites characteristic of the object (e.g., in facial images, the centers of the eyes, the corners of the mouth, etc.). For this process it is convenient to use a graphical interface which allows the user to move node points around with the help of a computer mouse.

When node points are selected in all images of the collection, jets are extracted at those node points and are assembled into the bunch graph structure described previously.

Individual jets or groups of jets in the bunch graph can be manually labeled with attribute information (such as gender of a person, breed of animal, make of car, etc.).

2. Automatic Image Graph Generation. After a bunch graph for a particular type of object has been prepared, new images can be analyzed automatically by bunch graph matching, as described previously. If the gallery associated with the bunch graph covers enough object variants, bunch graph matching will result in reliable and precise placement of nodes on their intended object parts. Image graph generation can take place in two steps. In the first step, a bunch graph is used that is optimized for reliably finding instances of the object type in images and to estimate the size and the orientation of the object. With this information in hand, an appropriate region of the image can be cut out and normalized as to size. In this region, the final image graph can be identified by matching to a second bunch graph, one that is designed to extract the data important for the final purpose (such as object recognition). For example of grids adapted to these two stages see FIG. 3. Image graphs thus created are stored in a gallery for later use.

3. Object Recognition by Comparison to Galleries of Model Graphs. With the help of a bunch graph (or several bunch graphs to support several stages as described and/or to cover different poses or types), an image graph is extracted from an image (or video frame) that is presented to the system. This image graph can then be compared efficiently to a gallery of stored image graphs of the same pose or type. This image graph comparison is done in terms of a simple graph similarity as in equation 6, with or without the distortion term (the relative importance of which is proportional to the user-controlled parameter $\lambda$ in that equation). The computation is efficient since no graph adaptation steps are necessary. This graph comparison gives a similarity value for each model graph stored in the gallery. The graph with the best similarity value can be taken as identifying the object or person recognized. A confidence measure can be derived from the distribution of similarity values, by using, for example, a threshold on the distance between the best match and the second best or on the mean of all other matches.

Additional Implementations (Embodiments) and Operations

1. Variants of Gabor-Based Wavelets. Instead of wavelets of the form of equation 1, other types of wavelets (for instance, Mallat-wavelets) can be used. The wavelet transform can be implemented directly as a convolution, as in equation 2, or with the help of a Fast Fourier Transform. The wavelet transform can be speeded by using a pyramid-type scheme (according to which the lower frequency levels are computed by first low-pass filtering and then down-sampling the image).

2. Determination of Localization, Orientation and Size of Object. After proper identification of the image graph, its localization, orientation, and size determine those quantities for the object found in the image.

3. Determination of Pose of Object. Several bunch graphs that are constructed for different poses of the object can be used side-by-side. During the matching process, each bunch graph is matched individually to the image, and the one with the best similarity is selected along with the image graph it created. The identity of the best-matching bunch graph determines the pose. For graph structures adapted to different head poses, see FIG. 3.

4. Automatic Extraction of Standardized Portraits from Images. If images are presented which each contain one or several instances of the object class(es) represented in bunch graphs, although in varying orientation, size, and pose, bunch graph matching can be used to determine those instances and parameters. Consequently, windows of appropriate location, size, and orientation can be cut out from the image and can be resized to a normal format. Instances of different pose can be labeled and sorted according to pose. It is thus possible to automatically create large collections of standardized portraits (for instance, of persons taken from (group-) photographs, of animals of a particular species or kind, of vehicles of the same type but different make or individuality, etc.)

5. Automatic Incorporation of New Image Graphs into a Bunch Graph. Starting from an already existing bunch graph, automatically created image graphs can be incorporated in the bunch graph to enlarge its domain of applicability.

6. Statistical Optimization of Bunch Graphs. Statistical methods can be used to select entries in the bunch graph. An important criterion could be recognition success and (small) number of entries in the bunch graph. Within the bunch of jets attached at a bunch graph node, clustering methods can be used to find subsets of similar jets. These can then be replaced by just one representative (a statistical mean or a jet near the center of a cluster).

7. Preparation of a Matrix of Pair-Wise Similarities between Objects. Given a gallery of image graphs, a matrix of pair-wise similarities can be prepared, using the graph similarity of equation 6, with or without the distortion term. This matrix can be used and evaluated for several purposes. Clusters of graphs with large mutual similarity can be determined. These clusters can be used to identify sub-types of the object class that is being examined. The clusters can be used to create new bunch graphs to cover the sub-types or distinctions thus identified.

8. Determination of Attributes. During bunch graph matching, as described previously, each node of the final image graph is identified with the best-matching jet in the corresponding node of the bunch graph. If an attribute label (for example, gender of a person, or the presence of a beard or glasses or type of hair-style, or a particular breed of a given animal species, or a particular make of a vehicle type) is attached to the identified jet, that attribute can be attached to the node of the image graph. The resulting distribution of attribute labels on the nodes of the image graph can be evaluated in various ways. A classification of the object in the image in terms of type (e.g., gender, age or facial expression of person, lineage of animal, make of car) can be achieved by letting the attribute labels vote, a clear majority determining the type, or with the help of Bayesian estimation methods. By a similar procedure, the type of an object part (hair-style or beard of person, expression of mouth or eyes, type of attachment on vehicle or machine etc.) can be determined with the help of attributes that are attached to individual nodes or to groups of nodes of models in the bunch graph.

9. Use of Attributes for More Efficient Gallery Search. The bunch graph method can be used to automatically classify and label all image graphs in a gallery according to a number of attributes (e.g., age, gender, subspecies, peculiar features like scar or birth mark). During a recognition task, these attributes can be exploited to make the search more efficient (e.g., by concentrating the search on only those gallery graphs with the right attributes) or more reliable (by using the attributes as additional support for a particular identification).

10. Improving the Efficiency of Object Recognition. Using a pre-compiled matrix of similarities within the gallery, search methods can be devised that are more efficient than exhaustive search of all gallery image graphs.

11. Automatic Preparation of a Composite Image. After a bunch graph is matched to an image, the information as to which jet of the bunch graph was most similar to the image jet is available for each node of the image graph. This information can be used to construct a "composite image" that is based entirely on data derived from the sample images that went into the bunch graph (or from the jets in the bunch graph). A simple way to construct the composite is as follows. Assume all sample images of the bunch graph have the same format (same width and height, measured in pixels). Subdivide this region into tiles such that each tile contains exactly one node of the bunch graph. Assume that for node n the jet of sample image m has been selected during the bunch graph match. Then, cut tile n out of image m. Repeat this for all nodes of the bunch graph and form a single image out of all these tiles. A small amount of smoothing Will suppress discontinuities at the tile borders. The resulting image is the composite image. (An alternative method could reconstruct an image out of the jet data in the bunch graph.) Experiments have shown that for reasonably rich bunch graphs, composite images come very close to the original images.

12. Identification of Unusual Object Features. By comparing a composite image with the original image (for instance, by subtracting corresponding pixel values from each other) unusual features can be detected, that is, features that were not contained in the sample images used to prepare the bunch graph (for instance, abnormalities of body shape for different individuals of an animal species).

Description of the Invention with Relation to the Figures

Referring now to the drawings, FIG. 1 shows a data format for image representation. An image 1 is selected to be analyzed. The image 1 is in the form of a pixel array (typically 512×512 or 128×128 pixels). Each pixel is a fixed point represented as a number, typically in the range 0–256. Pixels are indexed by their horizontal (x-) and vertical (y-) position. A general image may contain one or several pictured objects (for instance, human faces).

One of the kernels 2a described in equation 1 is also shown. The kernel is centered on the middle of the square. The value zero is represented by the average gray, whereas positive values are lighter and negative values are darker. This kernel 2a is of low frequency (short k-vector), and the k-vector points at 2 o'clock. Another kernel 2b has a higher frequency and a k-vector pointing to 4:30 o'clock.

The image 1 convolved with the kernel 2a is shown as 3a. The imaginary component (that is, the sine component) is shown, the oscillatory term in equation 1 being $\exp(ik_j \cdot x) = \cos(k_j \cdot x) + i\sin(k_j \cdot x)$, as well as the imaginary part of the convolution 3b of the image 1 with the kernel 2b. The magnitude 4a, $a_j(x)$ of the convolution of the image 1 with the kernel 2a is used in the similarity functions equations 4 and 5. The magnitude 4b of the convolution of the image 1 with the kernel 2b is also shown. The jet $J(x)$ at the pixel position x is the vector of the convolutions of the image 1 with all the different kernels, taken at position (x), that is, it is the set $J(x) = \{J_j(x), j=1, \ldots, 40\}$. The jet is shown in FIG. 1 in schematic representation 5. The resulting image or model graph 6 is composed of a grid and of labels. The grid is a set of nodes and a set of edges (pairs of neighboring nodes). There are two kinds of labels. Edge labels are distance vectors between node positions (measured in pixels in the x- and y- directions). Node labels are jets that are extracted from an image by positioning the grid over the image and extracting the jets computed at the node positions.

FIG. 2 shows graphs as placed over objects. An image 21a is selected here to derive a model graph. Another image 21b is shown in which an image graph has been formed by graph matching with the graph of the model graph derived from the image 21a. The model graph 22 is formed by placing a regular grid over the object and extracting jets at the node points of the grid. The node points 23 of the grid are shown, as are the edges 24 of the grid. An image graph 25 is formed in image 21b. It is the graph that best matches the model graph shown for image 21a, formed by the matching procedure described previously.

FIG. 3 shows graphs as placed over objects for an irregular, object type-adapted graph structure. A frontal image with image graph 31 is selected. The qualitative image graph structure is adapted to the task of finding a frontal face in an image, a large proportion of the number of nodes lying on the outline and relatively few nodes in the face region. The actual image graph (that is, the precise node positions) has been created by matching to a bunch graph as described previously. Another frontal image. with image graph 32 is shown. The qualitative image graph structure is adapted to the task of face recognition, a large proportion of the number of nodes lying over facial features (eyes, nose, mouth) that are characteristic for a person and are not likely to change (as does the outline with changing hairstyle). An image of a person in half-profile 33 is shown. The graph structure is adapted for face finding. An image of a person in half-profile 34 is also shown. The graph structure is adapted for recognition. Image graph nodes 35 and image graph edges 36 are shown for all the graph structures.

Figure 4:
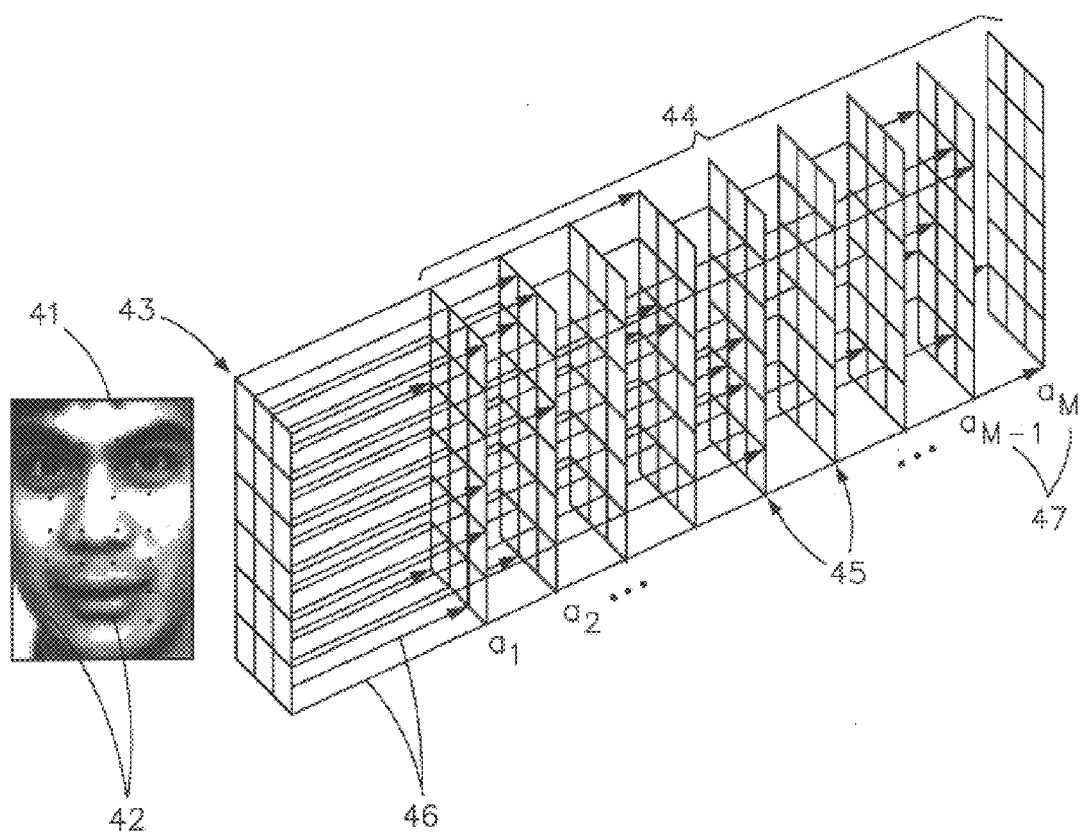
FIG. 4 shows a bunch graph and image graph.

FIG. 4 shows a bunch graph and an image graph. Part of an image 41 containing a face is selected. An image graph is placed over the image, utilizing bunch graph matching (only the nodes 42 are shown, not the edges). The image shown has been cut out of a larger image, the position of the frame being centered on the image graph. The qualitative structure of the image graph is a rectangular grid in this case. A schematic depiction of the image graph 43 is shown in its relation to the bunch graph 44. The bunch graph 44 is a collection of model graphs (typically 50–100) derived from images of the type of object and pose of concern (frontal faces in this example). Individual model graphs 45 are shown in the bunch graph which are derived from sample images. All model graphs have the same qualitative graph structure and identically-numbered nodes. The nodes carrying the same number in different model graphs refer to the same qualitative part of the sample objects (for instance, left eye of a face). For each node in a model graph a jet is stored that was derived from the node position in the corresponding sample image. The stored distance vectors for a given pair of nodes are identical for all model graphs, and are computed as an average, equation 7. Pointers 46 are directed from the nodes of the image graph to the best-matching nodes of the bunch graph. When an image node is repositioned during the bunch graph matching process, it extracts the jet from the Image that is centered at the new position, compares it to all the jets attached to the corresponding nodes in the bunch graph, and selects the one with the highest similarity. In this way, the bunch graph can optimize its total similarity, equation 8, making use of all possible combinations of stored jets (restricted only by the requirement that bunch graph jets have to be selected from the correct node). Attributes 47 are attached to the model graphs (for instance, gender, age and happiness/sadness of the person represented by the model graph).

While the invention has been described by way of example and in terms of preferred embodiments, it is to be understood that the invention is not limited to the disclosed embodiments. To the contrary, it is intended to cover various modifications and similar arrangements. Therefore, the claims should be accorded the broadest interpretation so as to encompass all such modifications and similar arrangements.

What is claimed is:

1. A method for analysis of a feature in an image having an array of pixel positions, comprising the steps of:

selecting a pixel position in the image associated with the feature;

extracting a jet at the pixel position using wavelet transformations, the jet being represented by a predetermined number of coefficients; and comparing the extracted jet with a plurality of reference jets, each reference jet being associated through a human assisted process with an attribute label for a particular feature type, to select an attribute label for the feature.

2. A method for analysis of a feature in an image as defined in claim 1, wherein the wavelet transformations use Gabor wavelets.

3. A method for analysis of a feature in an image as defined in claim 1, wherein each coefficient of a jet is generated based on a Gabor wavelet having a particular orientation and frequency.

4. A method for analysis of a feature in an image as defined in claim 1, wherein the predetermined number of coefficients representing the jet is 40.

5. A method for analysis of a feature in an image as defined in claim 1, wherein the coefficients are of complex numbers.

6. A method for analysis of a feature in an image as defined in claim 1, wherein the feature in the image is a facial feature.

7. A method for analysis of features in an image having an array of pixel positions, comprising the steps of:

selecting pixel positions in the image corresponding to nodes of a graph, each node for analyzing a local feature in the image;

extracting a jet at each selected pixel position using wavelet transformations, each jet being represented by a predetermined number of coefficients; and comparing each of the extracted jets with a plurality of reference jets, each reference jet being associated through a human assisted process with an attribute label for a particular local feature type, to select an attribute label for each local feature associated with a node of the graph.

8. A method for analysis of features in an image as defined in claim 7, wherein the wavelet transformations use Gabor wavelets.

9. A method for analysis of features in an image as defined in claim 7, wherein each coefficient of a jet is generated based on a Gabor wavelet having a particular orientation and frequency.

10. A method for analysis of features in an image as defined in claim 7, wherein the predetermined number of coefficients representing a jet is 40.

11. A method for analysis of features in an image as defined in claim 7, wherein the coefficients are complex numbers.

12. A method for analysis of features in an image as defined in claim 7, wherein the features in the image are facial features.

13. A method for analysis of features in an image as defined in claim 7, further comprising determining an image feature type based on a vote of the attribute labels selected for the local features.

* * * * *